(12) United States Patent
Tsuchiya et al.

(10) Patent No.: US 8,584,779 B2
(45) Date of Patent: Nov. 19, 2013

(54) STRUCTURE FOR MOUNTING POWER SOURCE APPARATUS

(75) Inventors: Takenori Tsuchiya, Toyota (JP); Hajime Oyanagi, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/058,900

(22) PCT Filed: Apr. 27, 2009

(86) PCT No.: PCT/JP2009/001919
§ 371 (c)(1), (2), (4) Date: Feb. 14, 2011

(87) PCT Pub. No.: WO2010/125602
PCT Pub. Date: Nov. 4, 2010

(65) Prior Publication Data
US 2012/0031695 A1 Feb. 9, 2012

(51) Int. Cl.
*B60K 1/04* (2006.01)
(52) U.S. Cl.
USPC .......................................... 180/68.5; 903/951
(58) Field of Classification Search
USPC ................................. 180/65.1, 68.5; 903/951
See application file for complete search history.

(56) References Cited

U.S. PATENT DOCUMENTS

| | | | | |
|---|---|---|---|---|
| 5,378,555 A * | 1/1995 | Waters et al. | .................... | 429/97 |
| 8,016,063 B2 * | 9/2011 | Tsuchiya | ..................... | 180/68.5 |
| 2003/0089540 A1 * | 5/2003 | Koike et al. | .................. | 180/68.5 |
| 2008/0196957 A1 * | 8/2008 | Koike et al. | .................. | 180/68.5 |

FOREIGN PATENT DOCUMENTS

| | | |
|---|---|---|
| JP | 5-193366 | 8/1993 |
| JP | 7-52658 | 2/1995 |
| JP | 11-41710 | 2/1999 |
| JP | 2001-283937 | 10/2001 |
| JP | 2004-161054 | 6/2004 |
| JP | 2004-243882 | 9/2004 |
| JP | 2004-345452 | 12/2004 |
| JP | 2004-345453 | 12/2004 |
| JP | 2005-132348 | 5/2005 |
| JP | 2005-247063 | 9/2005 |
| JP | 2006-168600 | 6/2006 |

(Continued)

OTHER PUBLICATIONS

Technical Report published by Japan Institute of Invention and Innovation for JP 2008-501625 dated Mar. 3, 2008.

(Continued)

*Primary Examiner* — Frank Vanaman
(74) *Attorney, Agent, or Firm* — Finnegan, Henderson, Farabow, Garrett & Dunner, LLP

(57) ABSTRACT

A structure for mounting a power source apparatus includes a power source apparatus mounted on a vehicle, and a reinforcing member configured to reinforce connection between the power source apparatus and a vehicle body. The power source apparatus has a power source unit and a device fixed to an upper face of the power source unit and having a length in a front-back direction of the vehicle smaller than a length of the power source unit. The reinforcing member extends in a left-right direction of the vehicle and is fixed at different portions to the power source apparatus and the vehicle body in space above the power source unit and adjacent to the device in the front-back direction of the vehicle.

9 Claims, 11 Drawing Sheets

(56) References Cited

FOREIGN PATENT DOCUMENTS

| | | |
|---|---|---|
| JP | 2007-22140 | 2/2007 |
| JP | 2007-296935 | 11/2007 |
| JP | 2007-335202 | 12/2007 |
| JP | 2008-30722 | 2/2008 |
| JP | 2008-220033 | 9/2008 |
| JP | 2008-273279 | 11/2008 |

OTHER PUBLICATIONS

Translation of International Preliminary Report on Patentability for PCT/JP2009/001919, mailed Nov. 17, 2011.

Translation of the International Preliminary Report on Patentability dated Nov. 17, 2011.

International Search Report in International Application No. PCT/JP2009/001919; Mailing Date: Jul. 14, 2009.

\* cited by examiner

US 8,584,779 B2

STRUCTURE FOR MOUNTING POWER SOURCE APPARATUS

CROSS-REFERENCE TO RELATED APPLICATIONS

This application is a national phase application of International Application No. PCT/JP2009/001919, filed Apr. 27, 2009, the contents of which are incorporated herein by reference.

TECHNICAL FIELD

The present invention relates to a structure for mounting a power source apparatus on a vehicle.

BACKGROUND ART

In a hybrid vehicle or an electric vehicle capable of running with output from a motor, a battery is mounted for supplying power to the motor. As described in Patent Document 1, an electronic device may be fixed to an upper face of a battery. As described in Patent Document 2, a battery may be provided by stacking a plurality of battery units in an up-down direction of a vehicle and fixing them to each other.

PRIOR ART DOCUMENTS

Patent Documents

[Patent Document 1] Japanese Patent Laid-Open No. 2008-030722 (Paragraph 0023, FIG. 6, and FIG. 8)
[Patent Document 2] Japanese Patent Laid-Open No. 11 (1999)-041710 (FIG. 1 and FIG. 3)
[Patent Document 3] Japanese Patent Laid-Open No. 2007-335202
[Patent Document 4] Japanese Patent Laid-Open No. 2008-273279
[Patent Document 5] Japanese Patent Laid-Open No. 2004-243882
[Patent Document 6] Japanese Patent Laid-Open No. 5 (1993)-193366
[Patent Document 7] Japanese Patent Laid-Open No. 2005-247063
[Patent Document 8] Japanese Patent Laid-Open No. 2005-132348
[Patent Document 9] Japanese Patent Laid-Open No. 2007-022140
[Patent Document 10] Japanese Patent Laid-Open No. 2001-283937

SUMMARY OF THE INVENTION

Problems to be Solved by the Invention

In mounting an object for mount on the vehicle provided by stacking a plurality of devices including the battery in the up-down direction of the vehicle as in Patent Documents 1 and 2, simply fixing a bottom face of the object to the vehicle may lead to insufficient fixing strength of the object. Especially when the object is formed of the plurality of battery units as in Patent Document 2, the fixing strength of the object tends to be insufficient.

Since an upper portion of the object (vehicle devices) is connected to an upper face of a trunk room by using a fixing member in Patent Document 1, the fixing strength of the object can be improved. In the configuration described in Patent Document 1, however, dedicated space for placing the fixing member should be ensured between the object and the trunk room. In other words, the fixing member should be placed by sacrificing part of the space which could otherwise be used as the trunk room.

It is thus an object of the present invention to provide a structure for mounting a power source apparatus in which the power source apparatus can be mounted on a vehicle with improved fixing strength by using a reinforcing member and the reinforcing member can be placed efficiently.

Means for Solving the Problems

A structure for mounting a power source apparatus according to the present invention includes a power source apparatus mounted on a vehicle, and a reinforcing member configured to reinforce connection between the power source apparatus and a vehicle body. The power source apparatus has a power source unit and a device, the device being fixed to an upper face of the power source unit and having a length in a front-back direction of the vehicle smaller than a length of the power source unit. The reinforcing member extends in a left-right direction of the vehicle and is fixed at different portions to the power source apparatus and the vehicle body in space above the power source unit and adjacent to the device in the front-back direction of the vehicle.

Serving as the vehicle body, a partition panel provided at a position separating space where a seat is placed from a luggage room is used. A portion of the power source apparatus can be located inside an opening portion formed in the partition panel. This allows the power source apparatus to be placed closer to the position of the seat to increase the size of the luggage room. In addition, the user of the reinforcing member can improve the strength of the opening portion in the partition panel.

The power source apparatus can be placed adjacently to the seat in the front-back direction of the vehicle. In this case, the reinforcing member can be placed in space surrounded by a back face of the seat, the upper face of the power source unit, and a side face of the device, the side face being opposed to the seat in the front-back direction of the vehicle. The reinforcing member can be located in a plane substantially orthogonal to an up-down direction of the vehicle and including the center of gravity of the power source apparatus. This can suppress a displacement of the power source apparatus in association with a collision of the vehicle, for example.

The device can include another power source unit different from the power source unit, and an electronic device fixed to an upper face of the other power source unit and connected to the two power source units. The device can be an electronic device connected to the power source unit.

The power source unit can be formed of a plurality of power storage elements connected electrically in series to each other and performing charge and discharge. It is possible to provide a heat transfer member in contact with the reinforcing member and each of the power storage elements to allow heat transfer between the reinforcing member and each of the power storage elements, and a heat exchange medium can be flowed in a hollow portion of the reinforcing member. Thus, the reinforcing member and the heat transfer member can be used to absorb heat from the power source elements or to provide heat for the power source elements. In other words, the temperature of the power source elements can be adjusted.

Effect of the Invention

According to the present invention, the power source apparatus can be mounted on the vehicle with improved fixing strength by using the reinforcing member and the reinforcing member can be placed with the efficient use of the space within the vehicle.

EMBODIMENTS OF THE INVENTION

Embodiments of the present invention will hereinafter be described.

Embodiment 1

Figure 1:
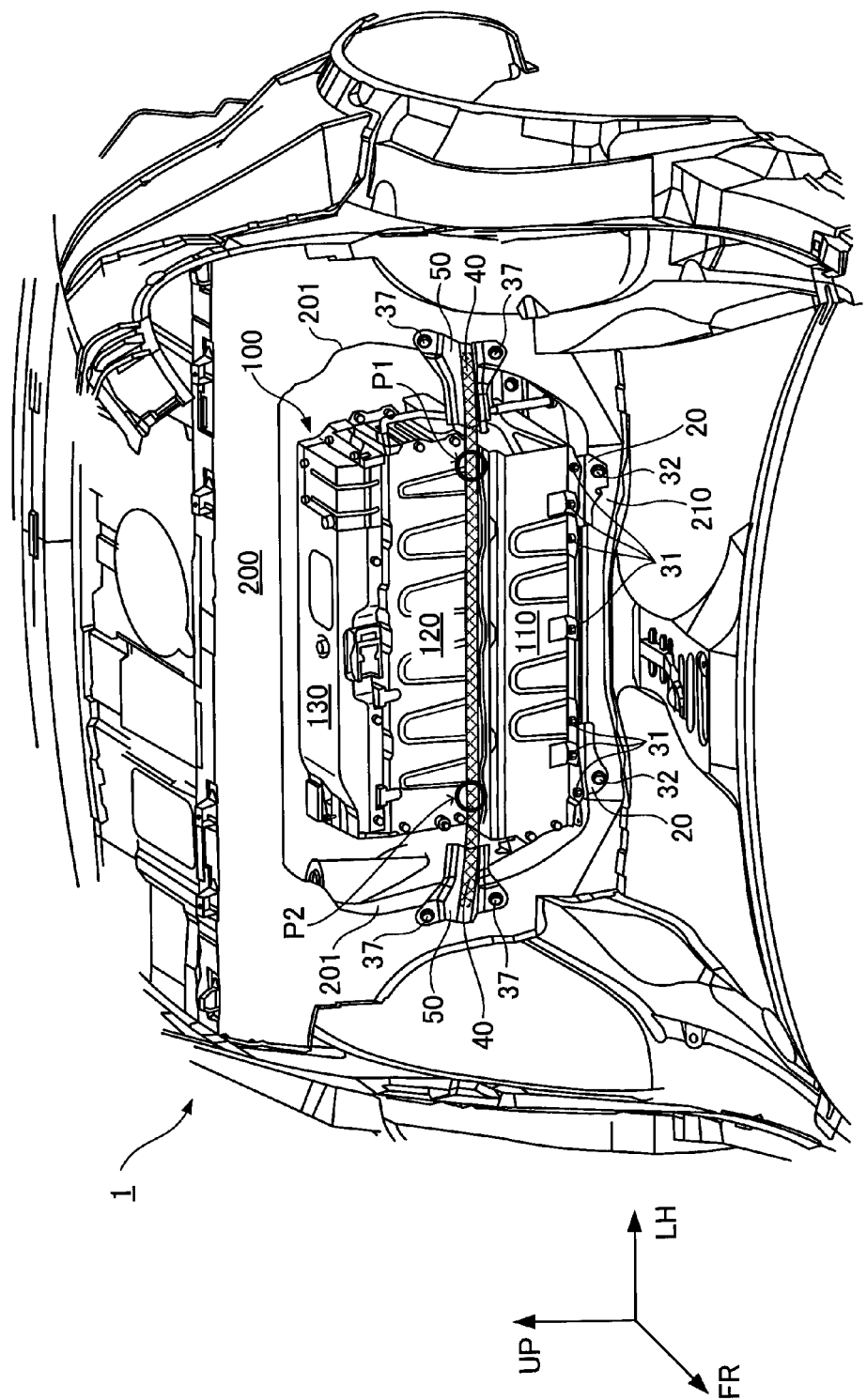
FIG. 1 A diagram of the outer appearance showing a structure for mounting a battery pack on a vehicle in Embodiment 1 of the present invention.
Figure 2:
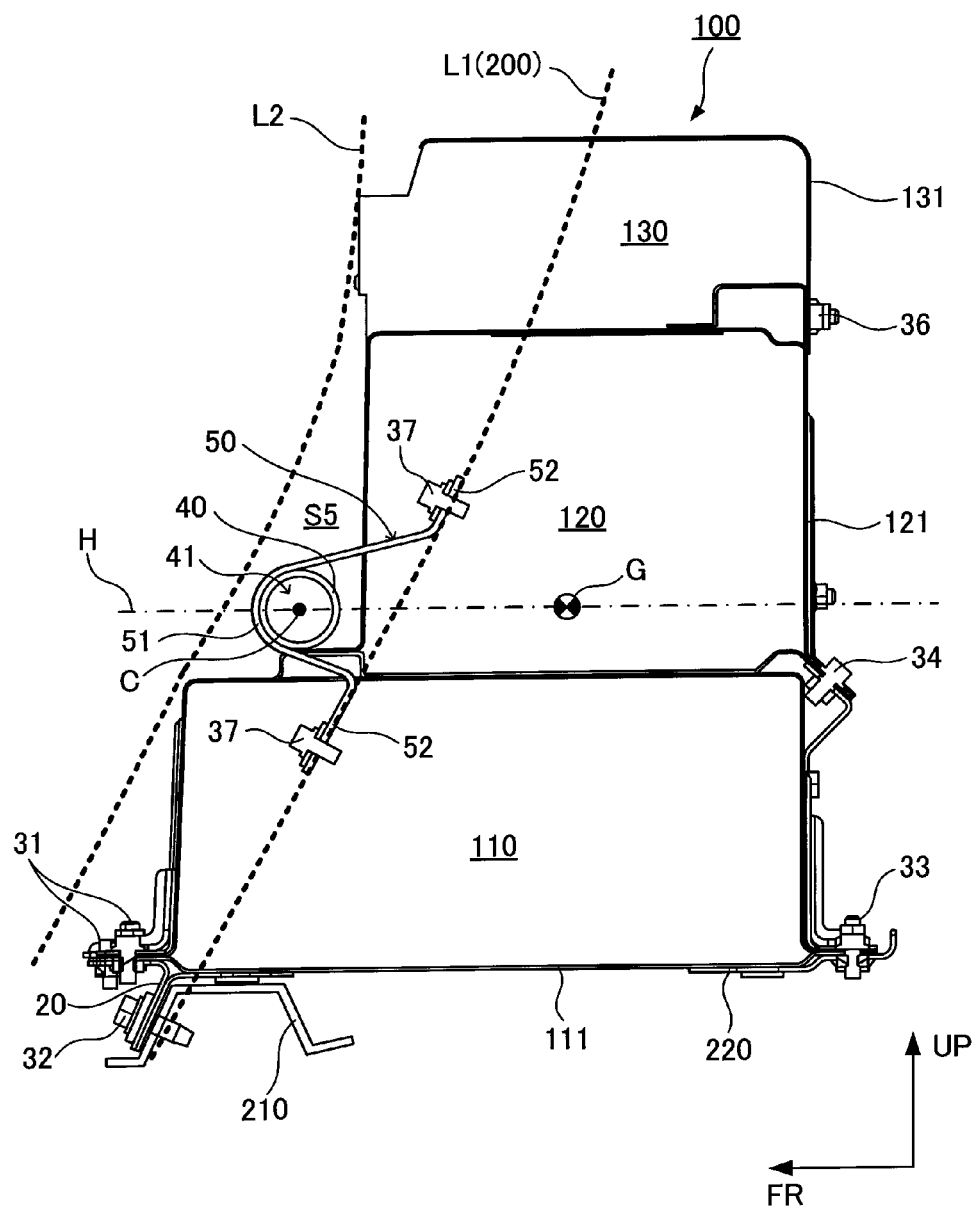
FIG. 2 A diagram showing a structure for fixing the battery pack in Embodiment 1.
Figure 3:
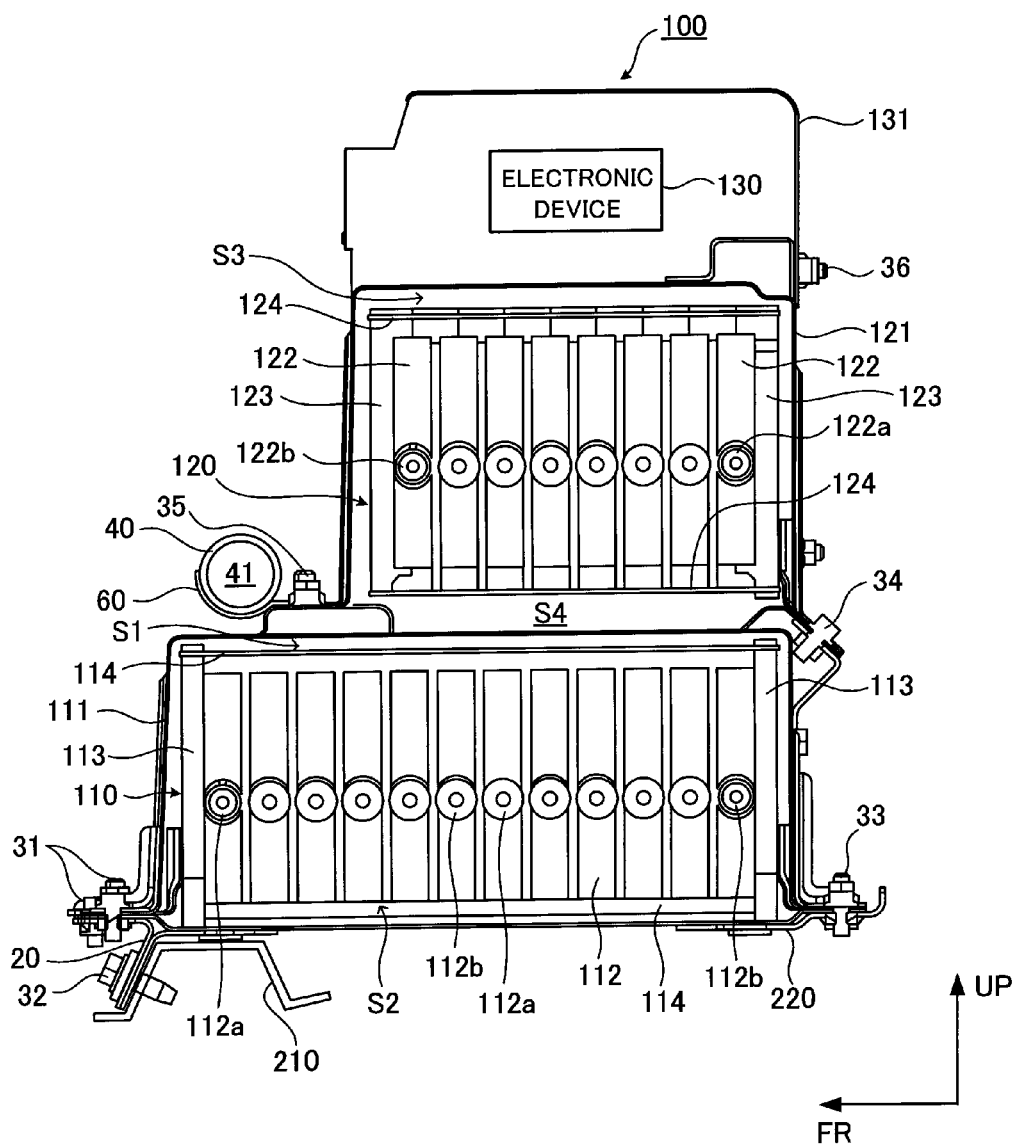
FIG. 3 A diagram showing the internal structure of the battery pack in Embodiment 1.

A structure for mounting a battery pack (power source apparatus) which is Embodiment 1 of the present invention will be described with reference to FIGS. 1 to 3. FIG. 1 shows the outer appearance of the configuration of part of a vehicle on which the battery pack is mounted. FIG. 2 is a side view showing a structure for fixing the battery pack to the vehicle, and FIG. 3 is a side view showing the internal structure of the battery pack. In FIGS. 1 to 3, an arrow FR indicates a front direction (forward direction) of a front-back direction of the vehicle, and an arrow UP indicates an up direction of an up-down direction of the vehicle. An arrow LH indicates a left direction when one faces the forward direction of the vehicle.

A battery pack 100 of the present embodiment is mounted on a vehicle 1. A hybrid vehicle or an electric vehicle is used as the vehicle 1. The hybrid vehicle is a vehicle which includes an internal-combustion engine or a fuel cell as a power source supplying energy for running of the vehicle 1 in addition to the battery pack 100. The electric vehicle is a vehicle which includes only the battery pack 100 as the power source of the vehicle 1.

As shown in FIG. 1, a partition panel (vehicle body) 200 of the vehicle 1 has an opening portion 201 formed therein, and the position of the battery pack 100 is located inside the opening portion 201. In other words, the battery pack 100 is placed so as to pass through the opening portion 201. The partition panel 200 is part of the vehicle body and is provided for improving rigidity of the vehicle body. A rear seat (not shown) is placed toward the front FR of the vehicle 1 relative to the battery pack 100, and a luggage space is provided toward the back of the vehicle 1 relative to the battery pack 100.

A line L1 shown in FIG. 2 indicates a surface of the partition panel 200 that is located toward the front FR of the vehicle 1. A line L2 shown in FIG. 2 indicates a portion (back face) of the rear seat that is located toward the back of the vehicle 1. The line L2 can be set in view of flexibility of the rear seat.

First, the structure of the battery pack 100 in the present embodiment will be described. As shown in FIGS. 2 and 3, the battery pack 100 has a lower-stage battery stack 110, an upper-stage battery stack 120, and an electronic device 130. The battery stacks 110, 120, and the electronic device 130 are placed in line in the up-down direction of the vehicle 1.

The lower-stage battery stack 110 is housed in a lower-stage battery case 111 and has a plurality of battery modules (power storage elements) 112 placed side by side in the front-back direction of the vehicle 1. The lower-stage battery stack 110 is fixed to an inner wall face of the lower-stage battery case 111. The lower-stage battery stack 110 and the lower-stage battery case 111 constitute a power source unit in the present invention. This applies to the other battery stack and the other battery case, later described.

A region of the lower-stage battery case 111 that is located toward the front FR of the vehicle 1 is fixed to a bracket 20 by fastening bolts 31. The bracket 20 is fixed to a cross member 210 by a fastening bolt 32. The cross member 210 constitutes part (bottom side) of the abovementioned opening portion 201. The provision of the cross member 210 can improve the rigidity of the vehicle body in the opening portion 201.

A region of the lower-stage battery case 111 that is located toward the back of the vehicle 1 is fixed to a floor panel 220 by a fastening bolt 33. The structure for fixing the lower-stage battery case 111 to the vehicle body is not limited to the abovementioned one, and it is only required to fix the lower-stage battery case 111 to the vehicle body. Examples of the vehicle body include the floor panel, the cross member, and a side member.

Each of the battery modules 112 constituting the lower-stage battery stack 110 has a plurality of cells connected electrically in series to each other, although not shown. The plurality of cells are placed side by side in one direction (a direction orthogonal to the sheet of FIG. 3) within a case of the battery module 112. A positive electrode terminal 112a and a negative electrode terminal 112b are provided on both side faces of the battery module 112 in the arrangement direction of the cells.

The case of the battery module 112 can be made of resin, for example. As the cell, a secondary battery such as a nickel metal hydride battery and a lithium-ion battery can be used. Alternatively, an electric double layer capacitor can be used instead of the secondary battery. While the plurality of battery modules 112 are placed side by side in one direction (the front-back direction of the vehicle 1) in the present embodiment, a plurality of cells may be placed side by side in one direction. While a so-called square-type cell is used in the present embodiment, the present invention is not limited thereto, and a so-called cylinder-type cell can be used, for example.

The positive electrode terminal 112a of one of the two adjacent battery modules 112 is connected electrically to the negative electrode terminal 112b of the other of the adjacent battery modules 112 through a bus bar (not shown). The plurality of battery modules 112 constituting the lower-stage battery stack 110 are connected electrically in series to each other through the bus bar.

A pair of end plates 113 are placed on both ends of the lower-stage battery stack 110 in the arrangement direction of the battery modules 112. A restraint band 114 extending in an X direction is connected to the pair of end plates 113. This can provide a restraint force for the plurality of battery modules 112 constituting the lower-stage battery stack 110. The restraint force acts in a direction which brings the two adjacent battery modules 112 closer to each other.

A spacer (not shown) is placed between the two adjacent battery modules 112 to form a path through which air for temperature adjustment is moved. A space S1 which takes in the air for temperature adjustment is provided above the lower-stage battery stack 110, and an intake duct (not shown) is connected to the space S1. An intake port of the intake duct faces the vehicle interior and can let in air within the vehicle interior in response to driving of a fan. The vehicle interior refers to space where a passenger rides.

The air taken into the intake duct is moved to the space S1 and then passes between the two adjacent battery modules 112. At this point, the air achieves heat exchange with the battery modules 112 to enable adjustment of the temperature of the battery modules 112. Specifically, air for cooling can be brought into contact with the battery modules 112 to suppress a rise in temperature of the battery modules 112. Alternatively, air for heating can be brought into contact with the battery modules 112 to suppress a drop in temperature of the battery modules 112.

A space S2 through which the air after the heat exchange is moved is provided below the lower-stage battery stack 110. An exhaust duct (not shown) is connected to the space S2 and allows the air moved into the space S2 to be discharged outside the vehicle. Alternatively, the intake duct can be connected to the space S2 and the exhaust duct can be connected to the space S1.

The upper-stage battery stack 120 is placed above the lower-stage battery stack 110. The upper-stage battery stack 120 is housed in an upper-stage battery case 121 and has a plurality of battery modules 122 similarly to the lower-stage battery stack 110. The upper-stage battery stack 120 is fixed to an inner wall face of the upper-stage battery case 121. The upper-stage battery case 121 is fixed to the lower-stage battery case 111 by fastening bolts 34 and 35.

The fastening bolt 34 is used for fixing portions (connecting portions) of the battery cases 111 and 121 that are located toward the back of the vehicle 1. The fastening bolt 35 is used for fixing portions (connecting portions) of the battery cases 111 and 121 that are located toward the front FR of the vehicle 1.

The plurality of battery modules 122 constituting the upper-stage battery stack 120 are placed side by side in one direction (the front-back direction of the vehicle 1) and are connected electrically in series to each other. Specifically, similarly to the lower-stage battery stack 110, a positive electrode terminal 122a of one of the two adjacent battery modules 122 is connected electrically to a negative electrode terminal 122b of the other of the adjacent battery modules 122 through a bus bar. Each of the battery modules 122 has a similar configuration to that of the battery module 112. Similarly to the lower-stage battery stack 110, the plurality of battery modules 122 are provided with a restraint force by a pair of end plates 123 and restraint bands 124.

The battery module 122 located at one end of the upper-stage battery stack 120 is connected electrically in series to the battery module 112 located at one end of the lower-stage battery stack 110. In other words, the upper-stage battery stack 120 and the lower-stage battery stack 110 are connected electrically in series to each other.

A space S3 which takes in air for temperature adjustment is provided above the upper-stage battery stack 120, and an intake duct (not shown) is connected to the space S3. Similarly to the intake duct provided for the lower-stage battery stack 110, the intake duct can let in air within the vehicle interior and can introduce the air within the vehicle interior to the space S3.

The air moved into the space S3 passes between the adjacent battery modules 122 and is moved into a space S4 provided below the upper-stage battery stack 120. The air can be brought into contact with the battery modules 122 to adjust the temperature of the battery modules 122. An exhaust duct is connected to the space S4 to allow the air after the heat exchange with the battery modules 122 to be discharged outside the vehicle. Alternatively, the intake duct can be connected to the space S4 and the exhaust duct can be connected to the space S3.

For the intake duct provided for the battery stacks 110 and 120, separate members can be used or a single intake duct can be branched to introduce the air into the battery stacks 110 and 120 simultaneously. Similarly, for the exhaust duct provided for the battery stacks 110 and 120, separate members can be used or a single exhaust duct can be branched to discharge the air from the battery stacks 110 and 120 simultaneously.

In the present embodiment, the number of the battery modules 122 constituting the upper-stage battery stack 120 is smaller than the number of the battery modules 112 constituting the lower-stage battery stack 110. The length of the upper-stage battery stack 120 is smaller than the length of the lower-stage battery stack 110 in the front-back direction of the vehicle 1. This provides space (space S5 in FIG. 2) above the lower-stage battery case 111 where the upper-stage battery case 121 (upper-stage battery stack 120) is not placed. The number of the battery modules 112 and the number of the battery modules 122 can be set as appropriate based on the output from the battery pack 100 as long as the two have the abovementioned relationship of the number of the modules 112, 122.

The battery module 122 located at one end (toward the back of the vehicle 1) of the upper-stage battery stack 120 and the battery module 112 located at one end (toward the back of the vehicle 1) of the lower-stage battery stack 110 are located in the same plane. In other words, the lower-stage battery stack 110 and the upper-stage battery stack 120 are placed such that their surfaces located toward the back of the vehicle 1 are aligned. Thus, the surface of the battery pack 100 that is located toward the back of the vehicle 1 is formed of generally flat face except for the portion in which the fastening bolt 34 is tightened.

The electronic device 130 is placed above the upper-stage battery stack 120. The electronic device 130 includes a device for controlling charge and discharge of the battery stacks 110 and 120 and is housed in a device case 131. The device case 131 is fixed to the upper-stage battery case 121 with a fastening bolt 36. The length of the device case 131 is substantially equal to the length of the upper-stage battery case 121 in the front-back direction of the vehicle 1. It should be noted that the length of the device case 131 can be smaller than the length of the upper-stage battery case 121.

Examples of the electronic device 130 include a system relay, a DC/DC converter, a service plug, a voltage sensor, an electric current sensor, and a battery monitoring unit.

The system relay is switched between an on-state and an off-state to permit or prohibit charge and discharge of the battery stacks 110 and 120. The DC/DC converter steps up and supplies the output voltage of the battery stacks 110 and 120 to an inverter and steps down and supplies the output voltage from the inverter to the battery stacks 110 and 120. The inverter converts a direct-current power from the DC/DC converter into an alternate-current power and supplies the alternate-current power to the motor to allow the motor to generate kinetic energy for running of the vehicle 1. In braking of the vehicle 1, the inverter can convert the regenerative power (alternate-current power) produced in the motor into a d.c. power and supply the direct-current power to the DC/DC converter.

The service plug is operated in order to cutoff an electric current path in the battery stacks 110 and 120. The voltage sensor detects the voltages in the battery modules 112 and 122 and outputs the detection results to the battery monitoring unit. The electric current sensor detects the electric currents in the batter stacks 110 and 120 and outputs the detection results to the battery monitoring unit. The battery monitoring unit acquires information (for example, SOC (State Of Charge)) about the power storage states of the battery modules 112 and 122 based on the outputs from the voltage sensor and the electric current sensor.

As shown in FIG. 2, the battery pack 100 of the present embodiment is placed closest to the rear seat (L2), and the space S5 is formed between the rear seat and the battery pack 100. The space S5 is surrounded by a back face of the rear seat, a side face of the upper-stage battery case 121, and an upper face of the lower-stage battery case 111. A metallic reinforcing bar (reinforcing member) 40 is placed in the space S5 and extends in a left-right direction of the vehicle 1. The reinforcing bar 40 is placed along the upper face of the lower-stage battery case 111.

As shown in FIGS. 2 and 3, the reinforcing bar 40 has a hollow portion 41 extending in a longitudinal direction of the reinforcing bar 40. A pair of support members 50 are placed at both ends of the reinforcing bar 40, and the support member 50 has a holding portion 51 and a fixing portion 52. The holding portion 51 is formed to have a shape matching an outer peripheral face of the reinforcing bar 40 and holds an end portion of the reinforcing bar 40. The fixing portion 52 is formed to have a shape matching a surface of the partition panel 200 and is fixed to the partition panel 200 by fastening bolts 37.

A bracket 60 shown in FIG. 3 is fixed by welding to the reinforcing bar 40 at each of positions shown by P1 and P2 in FIG. 1, and the bracket 60 is fixed to the battery pack 100 by a fastening bolt 35. The bracket 60 has a curved-face portion having a shape matching the outer peripheral face of the reinforcing bar 40 and a flat-face portion to which the fastening bolt 35 is attached. The fastening bolt 35 is used for fixing the bracket 60, the upper-stage battery case 121, and the lower-stage battery case 111 together.

The position and the number of the brackets 60 provided for the reinforcing bar 40 can be set as appropriate, and the structure for fixing the reinforcing bar 40 to the battery pack 100 can also be set as appropriate. In other words, it is only required to fix the reinforcing bar 40 to the battery pack 100. While the reinforcing bar 40 in the present embodiment is formed to have a generally circular shape in section orthogonal to the longitudinal direction, the present invention is not limited thereto, and the reinforcing bar 40 can be formed to have another shape such as a rectangular shape. It is essential only that the reinforcing bar 40 should extend in the longitudinal direction of the vehicle 1 and be fixed to the battery pack 100 and the partition panel 200.

While the pair of support members 50 are placed at both end portions of the reinforcing bar 40 in the present embodiment, the present invention is not limited thereto. For example, the support members 50 can be formed to have a shape matching the reinforcing bar 40. In addition, the reinforcing bar 40 can be fixed to a portion of the vehicle body different from the partition panel 200.

As shown in FIG. 2, the center C of the reinforcing bar 40 and the center of gravity G of the battery pack 100 are placed in the same plane (on a line H). The center C refers to the center of a sectional region of the reinforcing bar 40 when the bar 40 is cut along a plane orthogonal to the longitudinal direction thereof. The plane shown by the line H refers to a plane generally orthogonal to the up-down direction of the vehicle 1.

Since the reinforcing bar 40 is placed in the abovementioned positional relationship, the reinforcing bar 40 can easily suppress a displacement of the battery pack 100 even when an external force is applied so as to displace the battery pack 100 toward the front of the vehicle 1. While the center C and the center of gravity G are located on the line H in the present embodiment, the present invention is not limited thereto. Specifically, even when the center C of the reinforcing bar 40 is displaced from the plane (line H) including the center of gravity G, no problem occurs if part of the reinforcing bar 40 is located on the line H.

In the present embodiment, the lower-stage battery stack 110 and the upper-stage battery stack 120 are placed one on another in the up-down direction of the vehicle 1. As compared with the case where the battery stacks 110 and 120 are placed side by side on the floor panel of the vehicle 1, the battery pack 100 can be placed closer to the rear seat. In addition, since the electronic device 130 is placed above the upper-stage battery stack 120, the battery pack 100 including the electronic device 130 can be located closer to the rear seat. Since the opening portion 201 is provided in the partition panel 200 to place the battery pack 100 closest to the rear seat, the luggage space can be increased in size without increasing the size of the vehicle 1.

In the present embodiment, in addition to the fixing of the bottom face of the battery pack 100 to the vehicle body (the cross member 210 or the floor panel 220), the battery pack 100 is fixed to the vehicle body by using the reinforcing bar 40. This can improve the fixing strength of the battery pack 100 to the vehicle body. Also, the attachment of the reinforcing bar 40 to the opening portion 201 of the partition panel 200 can enhance the strength in the opening portion 201.

Since the reinforcing bar 40 is placed in the space (dead space) S5 formed between the rear seat and the battery pack 100, the dead space S5 can be utilized effectively. The length of the upper-stage battery stack 120 is smaller than the length of the lower-stage battery stack 110 in the front-back direction of the vehicle 1, so that the space (corresponding to the space S5) where the upper-stage battery case 121 is not located above the lower-stage battery case 111. Since this space is likely to be dead space, the placement of the reinforcing bar 40 in that space can provide the reinforcing bar 40 and the battery pack 100 in a compact manner.

While the lower-stage battery stack 110, the upper-stage battery stack 120, and the electronic device 130 are placed one on another in the up-down direction of the vehicle 1 in the battery pack 100 of the present embodiment, the present invention is not limited thereto. For example, it is possible to omit the upper-stage battery stack 120 and place the lower-stage battery stack 110 and the electronic device 130 one on another in the up-down direction of the vehicle 1. In this case, since dead space is also produced between the rear seat, the electronic device 130, and the lower-stage battery stack 110, the reinforcing bar 40 can be placed in this space.

While the lower-stage battery stack 110 and the upper-stage battery stack 120 are connected electrically in series to each other in the present embodiment, the present invention is not limited thereto. For example, the lower-stage battery stack 110 and the upper-stage battery stack 120 can be connected electrically in parallel to each other and the vehicle 1 can be run on the basis of the output from each of the battery stacks 110 and 120. When the battery stacks 110 and 120 have different output voltages from each other, different characteristics are set for the battery stacks 110 and 120 in stepping up the output voltages thereof, so that the voltages after the step-up can be substantially equal. On the other hand, the battery stacks 110 and 120 can be provided with substantially equal output voltages by setting different configurations for the battery modules 112 and 122 in the battery stacks 110 and 120.

While the battery modules 112 and 122 formed of the secondary battery are used in the present embodiment, the present invention is not limited thereto. For example, a fuel cell can be used instead of the power storage element such as the secondary battery. Specifically, a plurality of fuel cell stacks can be placed one on another in the up-down direction of the vehicle 1. The configuration described in the present embodiment can be applied to such a configuration.

Embodiment 2

Figure 4:
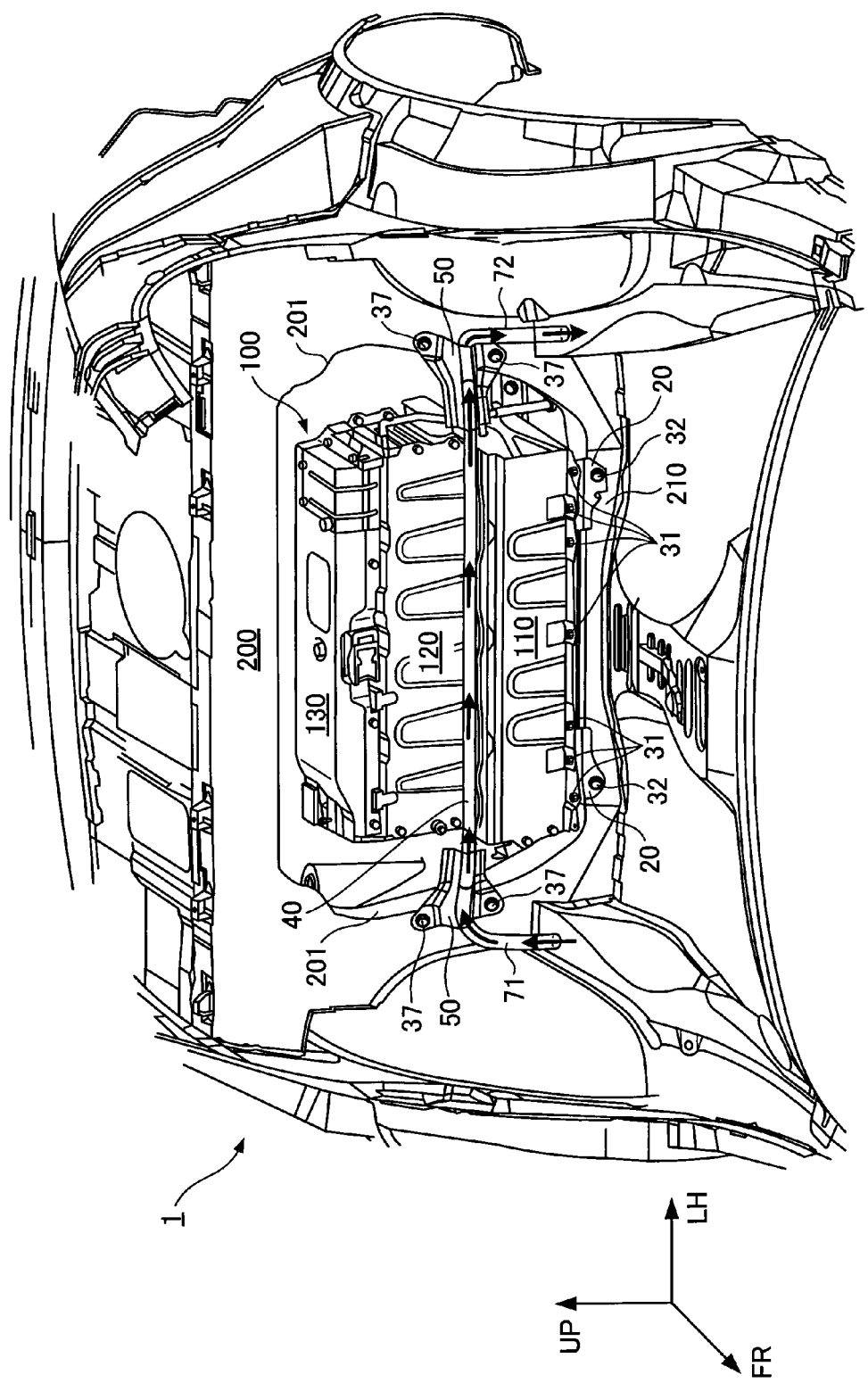
FIG. 4 A diagram of the outer appearance showing a cooling structure of a battery pack mounted on a vehicle in Embodiment 2 of the present invention.
Figure 5:
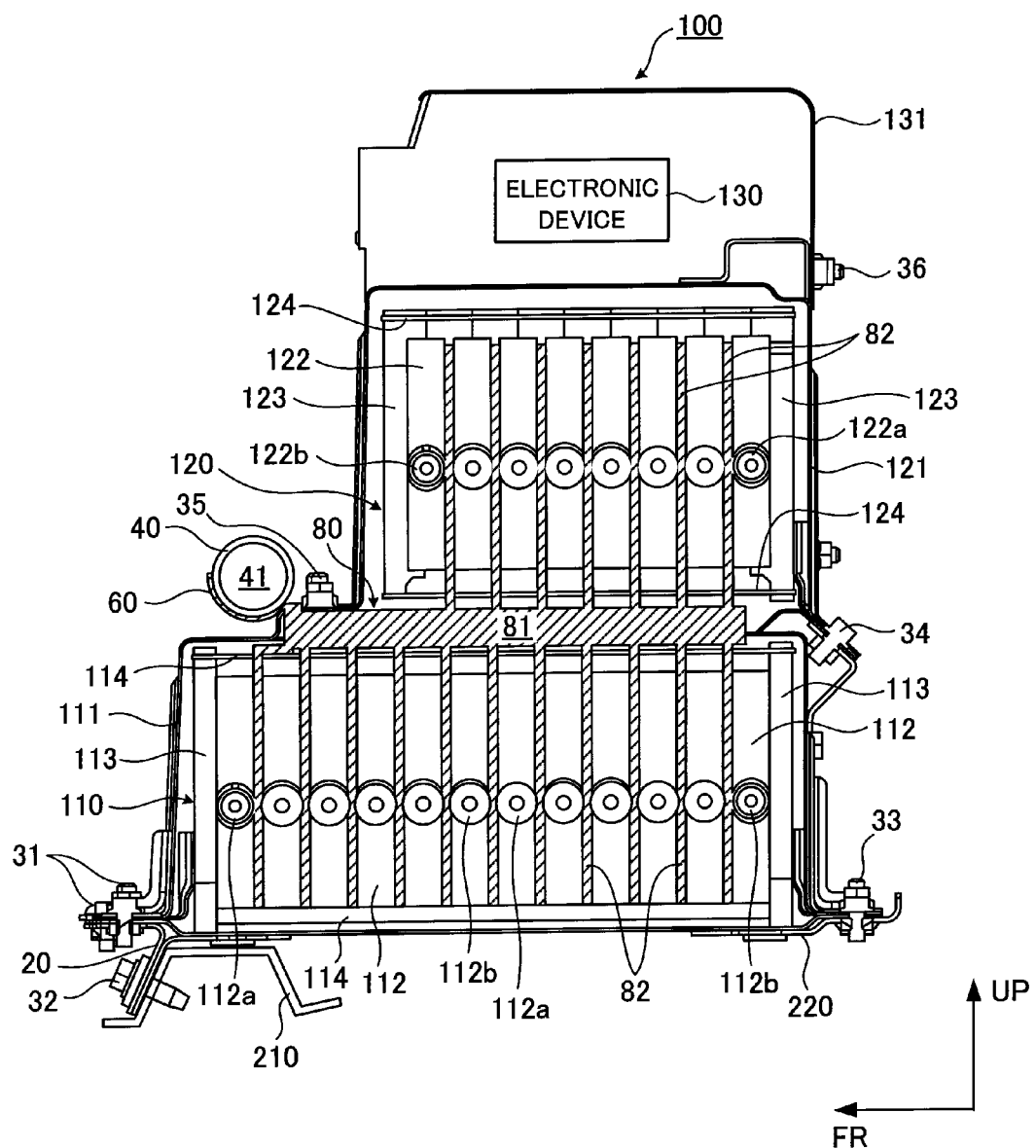
FIG. 5 A diagram showing the internal structure of the battery pack in Embodiment 2.

A structure for mounting a battery pack which is Embodiment 2 of the present invention will be described with reference to FIGS. 4 and 5. FIG. 4 shows the outer appearance of the structure for mounting a battery pack in the present embodiment, and FIG. 5 is a diagram showing the internal structure of the battery pack in the present embodiment. Members having the same functions as those of the members described in Embodiment 1 are designated with the same reference numerals and detailed description thereof is omitted. In the following, different points from Embodiment 1 will be mainly described.

In the present embodiment, a battery pack 100 is fixed to a vehicle body by a structure similar to that of Embodiment 1. A reinforcing bar 40 is used to adjust the temperature of the battery pack 100. A structure for adjusting the temperature of the battery pack 100 will hereinafter be described specifically.

A first duct 71 is connected to one end of the reinforcing bar 40 such that gas for temperature adjustment introduced through the first duct 71 enters a hollow portion 41 of the reinforcing bar 40. The gas for temperature adjustment is moved in a direction shown by arrows in FIG. 4. A second duct 72 is connected to the other end of the reinforcing bar 40 such that the gas passed through the reinforcing bar 40 is introduced into the second duct 72.

Air within the vehicle interior can be used as the gas for temperature adjustment, for example. Specifically, a fan (not shown) can be connected to one of the ducts 71 and 72 and be driven to cause the air within the vehicle interior to be taken into the first duct 71. The vehicle interior includes space where a passenger rides or luggage space. When air in the luggage space is introduced into the first duct 71, the driving sound of the fan can be prevented from reaching the space where the passenger rides through the first duct 71.

Gas other than the air can be used, or liquid can be used. In this case, the gas or the liquid can be circulated through the ducts 71 and 72 and the reinforcing bar 40 with a pump or the like, for example.

As shown in FIG. 5, a heat transfer member 80 such as a heat sink is connected to a bracket 60 fixed to the reinforcing bar 40. The heat transfer member 80 has a body portion 81 in contact with the bracket 60 and a plurality of heat transfer portions 82 connected to the body portion 81. A material (such as metal) having excellent heat transfer can be selected as appropriate for the material forming the heat transfer member 80. The body portion 81 is placed along an upper face of an upper-stage battery stack 120 between a lower-stage battery stack 110 and the upper-stage battery stack 120.

The heat transfer portion 82 is placed between two adjacent battery modules 112 (122) in the battery stack 110 (120). The heat transfer portion 82 is formed in plate shape and is in contact with side faces of the two adjacent battery modules 112 (122) that are opposed to each other in the arrangement direction of the battery modules 112 (122). It is essential only that the heat transfer portion 82 should be in contact with at least part of the battery module 112 (122). Each of the heat transfer portions 82 is placed to avoid interference with restraint bands 114 and 124 in the battery stacks 110 and 120, respectively.

When the battery modules 112 and 122 generate heat due to charge and discharge or the like, the heat of the battery modules 112 and 122 is transferred to the heat transfer portions 82 and then transferred to the bracket 60 through the body portion 81. Since the bracket 60 is in contact with the reinforcing bar 40, the heat transferred to the bracket 60 is transferred to the reinforcing bar 40. If gas for cooling has been flowed in the hollow portion 41 of the reinforcing bar 40, heat exchange between the reinforcing bar 40 and the gas can be performed to cool the reinforcing bar 40. This can cool the battery modules 112 and 122 through the reinforcing bar 40 and the heat transfer member 80. In supplying the gas after the heat exchange again to the hollow portion 41, the gas after the heat exchange is preferably cooled with a radiator or the like.

On the other hand, if gas for heating is flowed in the hollow portion 41 of the reinforcing bar 40, the heat is transferred to the reinforcing bar 40 and the heat can be transferred to the battery modules 112 and 122 through the bracket 60 and the heat transfer member 80. This can heat the battery modules 112 and 122. In supplying the gas after the heat exchange again to the hollow portion 41, the gas after the heat exchange is preferably heated with a heater or the like.

According to the present embodiment, the effects described in Embodiment 1 can be achieved, and the temperature of the battery modules 112 and 122 can be adjusted by using the reinforcing bar 40. When the battery modules 112 and 122 excessively generate heat or are excessively cooled, the input/output characteristics of the battery modules 112 and 122 may be deteriorated. Thus, the temperature of the battery modules 112 and 122 can be adjusted as in the present embodiment to suppress the deterioration of the input/output characteristics.

It is conceivable that an intake duct and an exhaust duct may be connected to each of the battery stacks 110 and 120 as a structure for adjusting the temperature of the battery stacks 110 and 120. In this case, two intake ducts and two exhaust ducts are necessary to complicate the structure for adjusting the temperature of the battery stacks 110 and 120. In contrast, in the present embodiment, since the temperature of the battery stacks 110 and 120 can be adjusted by using the structure for fixing the battery pack 100 to the vehicle body, the temperature adjusting structure can be simplified.

Figure 6:
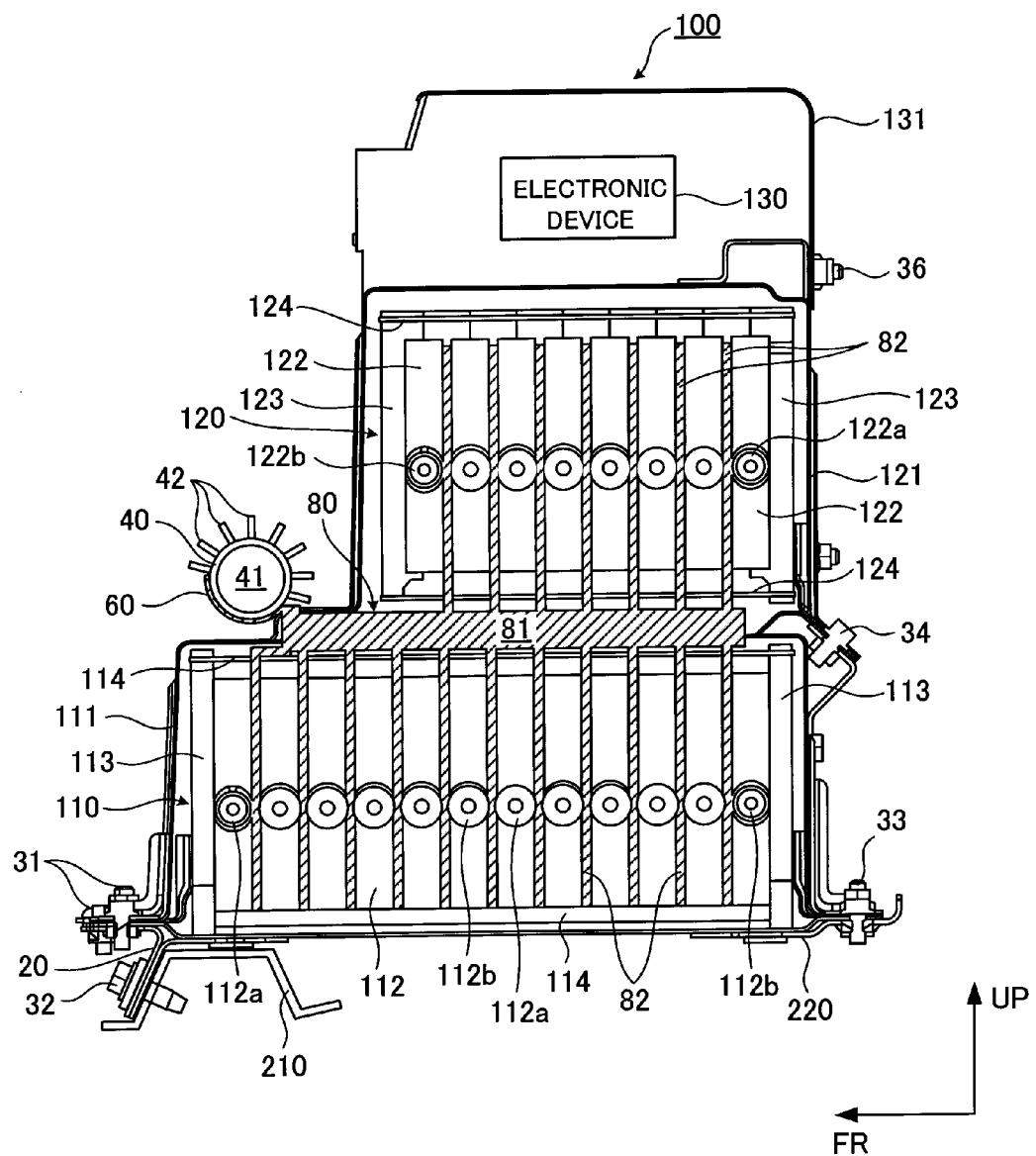
FIG. 6 A diagram showing the internal structure of a battery pack in a modification of Embodiment 2.

Next, a modification of the present embodiment will be described with reference to FIG. 6. FIG. 6 is a diagram showing the internal structure of a battery pack in the present modification. In the present modification, the temperature of battery modules 112 and 122 is adjusted by using a heat transfer member 80 similarly to the present embodiment.

In the present modification, the ducts 71 and 72 described in the present embodiment are omitted, and gas for temperature adjustment is not flowed in a hollow portion 41 of a reinforcing bar 40. A plurality of fins 42 are formed on an outer peripheral face of the reinforcing bar 40. Each fin 42 extends in a longitudinal direction of the reinforcing bar 40 and protrudes in a diameter direction of the reinforcing bar 40. The shape and the number of the fins 42 can be set as appropriate, and any shape and any number can be used as long as the fins 42 can be used to increase the surface area of the reinforcing bar 40.

In the present modification, when the battery modules 112 and 122 generate heat due to charge and discharge or the like, the heat is transferred to the reinforcing bar 40 through the heat transfer member 80 and a bracket 60. Since the plurality of fins 42 are formed on the reinforcing bar 40, the heat transferred to the reinforcing bar 40 can be easily dissipated to the outside through the fins 42. In other words, the heat radiation of the battery modules 112 and 122 can be improved.

Alternatively, gas for temperature adjustment can be flowed in the hollow portion 41 of the reinforcing bar 40 similarly to the present embodiment. In addition, a single or a plurality of fins can be provided on an inner peripheral face of the reinforcing bar 40 in the structure similar to that of the present embodiment. In this case, the area in the inner peripheral face of the reinforcing bar 40 can be increased to promote heat exchange between the gas for temperature adjustment and the reinforcing bar 40.

Embodiment 3

Figure 7:
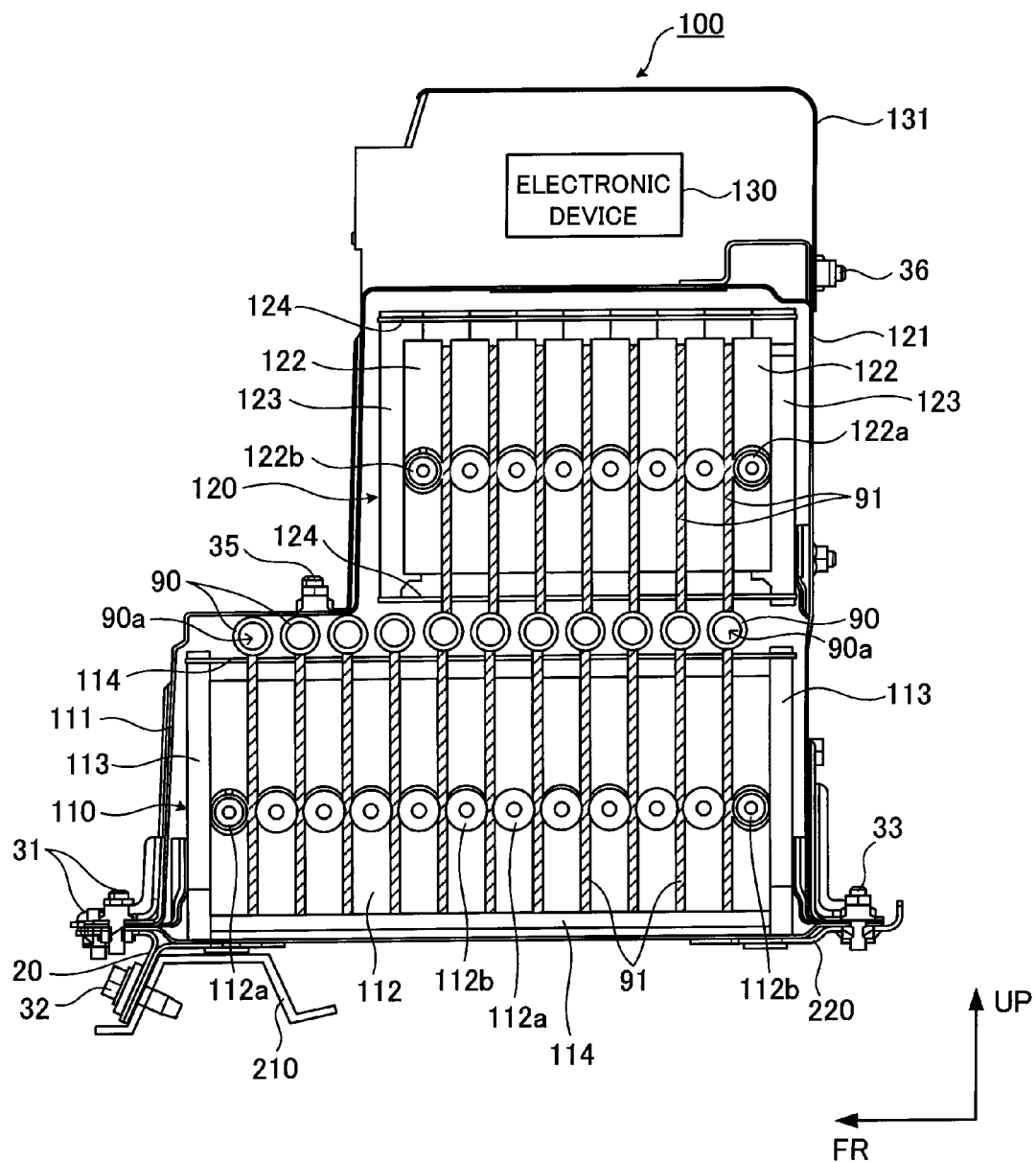
FIG. 7 A diagram showing the internal structure of a battery pack in Embodiment 3 of the present invention.
Figure 8:
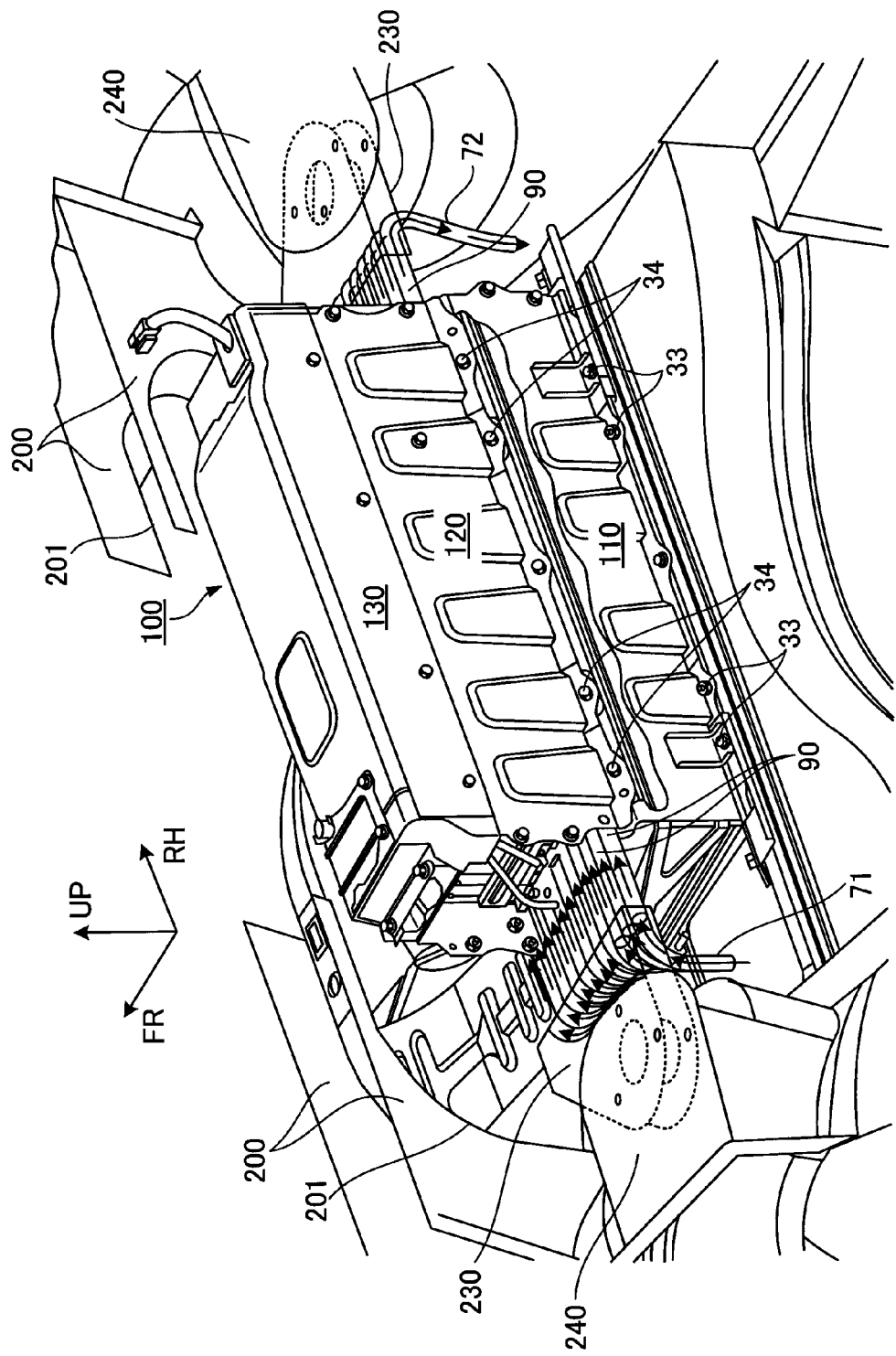
FIG. 8 A diagram showing the outer appearance of a cooling structure of the battery pack mounted on a vehicle in Embodiment 3.

A structure for mounting a battery pack which is Embodiment 3 of the present invention will be described with reference to FIGS. 7 and 8. FIG. 7 is a diagram showing the internal structure of the battery pack in the present embodiment, and FIG. 8 shows the outer appearance of the structure for mounting the battery pack in the present embodiment. An arrow RH shown in FIG. 8 indicates a right direction when one faces a forward direction FR of a vehicle 1. Members having the same functions as those of the members described in Embodiment 1 are designated with the same reference numerals and detailed description thereof is omitted. In the following, different points from Embodiment 1 will be mainly described.

While the reinforcing bar 40 is placed in the dead space formed between the battery pack 100 and the rear seat in Embodiment 1, a plurality of reinforcing bars 90 are placed between a lower-stage battery stack 110 and an upper-stage battery stack 120 in the present embodiment. Each of the reinforcing bars 90 extends in a left-right direction of the vehicle 1, and the plurality of reinforcing bars 90 are placed side by side in a front-back direction of the vehicle 1. The number of the reinforcing bars 90 and the shape of the reinforcing bar 90 in section orthogonal to a longitudinal direction thereof can be set as appropriate.

Each of the reinforcing bars 90 has a hollow portion 90a extending in the longitudinal direction of the reinforcing bar 90, and a heat transfer member 91 such as a heat sink is connected to each of the reinforcing bars 90. The heat transfer member 91 is formed in flat plate shape and is in contact with side faces of two adjacent battery modules 112 (122) that are opposed to each other in the arrangement direction of the battery modules 112 (122). It is essential only that the heat transfer member 91 should be in contact with at least part of the battery module 112 (122). The heat transfer member 91 can be formed of material (such as metal) having excellent heat conduction.

The plurality of reinforcing bars 90 are fixed to a lower-stage battery case 111 or an upper-stage battery case 121. As shown in FIG. 8, both end portions of the reinforcing bar 90 are connected to a pair of support members 230, and each of the support members 230 is fixed to a suspension tower 240 of the vehicle 1 by a fastening bolt. Thus, a battery pack 100 can be fixed to a vehicle body by using the support members 230 and the reinforcing bars 90. The suspension tower 240 is used for supporting a suspension spring.

A first duct 71 is connected to one end of the reinforcing bar 90 and a second duct 72 is connected to the other end of the reinforcing bar 90. Each of the ducts 71 and 72 has as many branches as the number of the reinforcing bars 90, and each branch is connected to each of the reinforcing bars 90. Gas for temperature adjustment is supplied to the hollow portion 90a of the reinforcing bar 90 through the first duct 71 and the gas passed through the hollow portion 90a is introduced to the second duct 72.

As described in Embodiment 2, when gas for cooling is flowed in the hollow portion 90a of the reinforcing bar 90, the battery modules 112 and 122 can be cooled through the heat transfer member 91. When gas for heating is flowed in the hollow portion 90a, the battery modules 112 and 122 can be heated through the heat transfer member 91. As described in Embodiment 1, liquid can be used instead of the gas, or the gas or the liquid can be circulated through the ducts 71 and 72 and the reinforcing bar 90.

In the present embodiment, the plurality of reinforcing bars 90 can be used to improve the fixing strength of the battery pack 100 to the vehicle body. In addition, the reinforcing bars 90 can be placed between the lower-stage battery stack 110 and the upper-stage battery stack 120 to provide the compact structure for fixing the battery pack 100. Furthermore, the gas for temperature adjustment can be flowed in the hollow portion 90a of the reinforcing bar 90 to adjust the temperature of the battery modules 112 and 122.

While the reinforcing bar 40 described in Embodiment 1 is omitted in the present embodiment, the reinforcing bar 40 can be provided similarly to Embodiment 1. Specifically, the reinforcing bar 40 described in Embodiment 1 can be used in order to improve the fixing strength of the battery pack 100, and the reinforcing bar 90 can be used in order to adjust the temperature of the battery modules 112 and 122. In this case, the reinforcing bar 90 does not need to have great rigidity.

Embodiment 4

Figure 9:
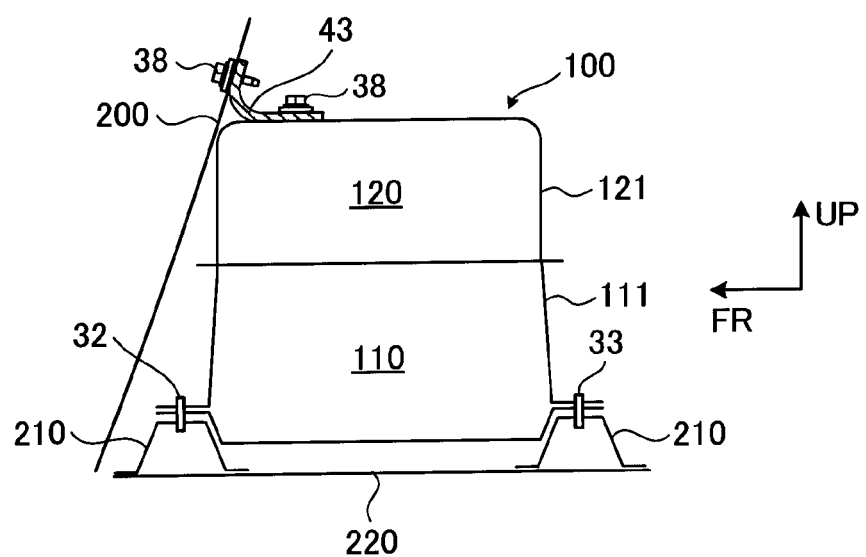
FIG. 9 A schematic diagram showing a structure for mounting a battery pack which is Embodiment 4 of the present invention.

A structure for mounting a battery pack which is Embodiment 4 of the present invention will be described with reference to FIG. 9. FIG. 9 is a schematic diagram showing the structure for mounting the battery pack in the present embodiment. Members having the same functions as those of the members described in Embodiment 1 are designated with the same reference numerals and detailed description thereof is omitted.

In the present embodiment, a lower-stage battery stack 110 and an upper-stage battery stack 120 are placed one on another in an up-down direction of a vehicle 1. The electronic device 130 described in Embodiment 1 is not placed above the upper-stage battery stack 120. A coupling member 43 is attached to an upper face of an upper-stage battery case 121 and a partition panel 200 by fastening bolts 38. The coupling member 43 is used for reinforcing the connection between a battery pack 100 and a vehicle body. On the other hand, a lower-stage battery case 111 is fixed to a cross member 210 on a floor panel 220 by fastening bolts 32 and 33.

According to the configuration of the present embodiment, since the coupling member 43 is used to fix the upper face of the battery pack 100 to the partition panel 200, the fixing strength of the battery pack 100 to the vehicle body can be enhanced as compared with the case where only the bottom face of the battery pack 100 is fixed to the cross member 210. In the present embodiment, the electronic device 130 described in Embodiment 1 can be placed above the upper-stage battery stack 120, and an upper face of a device case 131 can be fixed to the partition panel 200 with the coupling member 43.

Embodiment 5

Figure 10:
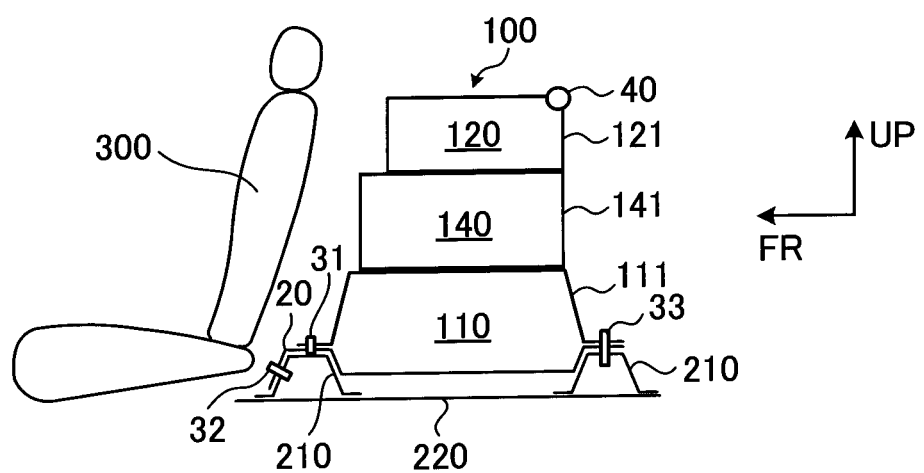
FIG. 10 A schematic diagram showing a structure for mounting a battery pack which is Embodiment 5 of the present invention.

A structure for mounting a battery pack which is Embodiment 5 of the present invention will be described with reference to FIG. 10. FIG. 10 is a schematic diagram showing the structure for mounting the battery pack in the present embodiment. Members having the same functions as those of the members described in Embodiment 1 are designated with the same reference numerals and detailed description thereof is omitted.

A battery pack 100 of the present embodiment is placed toward the back of a vehicle 1 relative to a rear seat 300, and has three battery stacks placed one on another in an up-down direction of the vehicle 1. Specifically, an intermediate-stage battery stack 140 is placed above a lower-stage battery stack 110, and an intermediate-stage battery case 141 which accommodates the intermediate-stage battery stack 140 is fixed to a lower-stage battery case 111. The intermediate-stage battery stack 140 has a plurality of battery modules connected electrically in series to each other similarly to the other battery stacks 110 and 120.

The lower-stage battery case 111 is fixed to a cross member 210 by a fastening bolt 33 and is fixed to a bracket 20 by a fastening bolt 31. The bracket 20 is fixed to the cross member 210 by a fastening bolt 32. The upper-stage battery stack 120 is placed above the intermediate-stage battery stack 140, and an upper-stage battery case 121 is fixed to the intermediate-stage battery case 141. A reinforcing bar 40 extending in a left-right direction of the vehicle 1 is fixed to an upper face of the upper-stage battery case 121, and both end portions of the reinforcing bar 40 are fixed to a suspension tower, respectively.

According to the present embodiment, the reinforcing bar 40 is used to fix an upper face of the battery pack 100 to the suspension tower which serves as a vehicle body. Thus, the fixing strength of the battery pack 100 to the vehicle body can be enhanced as compared with the case where only the bottom face of the battery pack 100 is fixed to the vehicle body. In addition, the battery pack 100 is formed of the three battery stacks 110, 120, and 140, so that the battery pack 100 can be reduced in size in a front-back direction of the vehicle 1. When the battery pack 100 is placed closer to the rear seat as described in Embodiment 1, luggage space of the vehicle 1 can be increased in size.

While the reinforcing bar 40 is fixed to the upper face of the battery pack 100 (the upper-stage battery case 121) in the present embodiment, the present invention is not limited thereto. Specifically, the reinforcing bar 40 can be placed in space formed between the battery pack 100 and the rear seat 300. When the length of the upper-stage battery case 121 is smaller than the length of the intermediate-stage battery case 141 in the front-back direction of the vehicle 1, the reinforcing bar 40 can be placed in space surrounded by an upper face of the intermediate-stage battery case 141, a side face of the upper-stage battery case 121, and a back face of the rear seat 300.

When the length of the intermediate-stage battery case 141 is smaller than the length of the lower-stage battery case 111 in the front-back direction of the vehicle 1, the reinforcing bar 40 can be placed in space surrounded by an upper face of the lower-stage battery case 111, a side face of the intermediate-stage battery case 141, and the back face of the rear seat 300. In such a case, the structure similar to that described in Embodiment 1 can be used.

Embodiment 6

Figure 11:
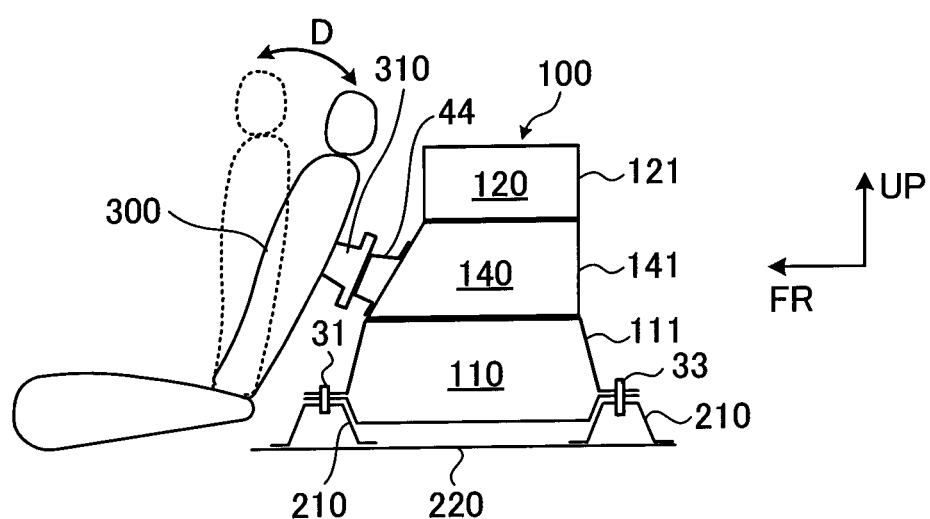
FIG. 11 A schematic diagram showing a structure for mounting a battery pack which is Embodiment 6 of the present invention.

A structure for mounting a battery pack which is Embodiment 6 of the present invention will be described with reference to FIG. 11. FIG. 11 is a schematic diagram showing the structure for mounting the battery pack in the present embodiment. Members having the same functions as those of the members described in the embodiments described above are designated with the same reference numerals and detailed description thereof is omitted.

A battery pack 100 in the present embodiment is placed toward the back of a vehicle 1 relative to a rear seat 300 similarly to Embodiment 5, and has three battery stacks 110, 120, and 140 placed one on another in an up-down direction of a vehicle 1. A lower-stage battery case 111 is fixed to a cross member 210 by fastening bolts 31 and 33.

A reinforcing bar 44 which extends in a left-right direction of the vehicle 1 is fixed to an intermediate-stage battery case 141 by a fastening bolt. As shown in FIG. 11, the reinforcing bar 44 has a structure with open section. The reinforcing bar 44 is fixed at both end portions to a vehicle body (the partition panel described in Embodiment 1) and is also fixed to a reclining mechanism 310 provided for a back face of the rear seat 300. The reclining mechanism 310 can move a seat back of the rear seat 300 in a direction shown by an arrow D in FIG. 11.

According to the present embodiment, the reinforcing bar 44 is used to fix the battery pack 100 to the reclining mechanism 310 and the partition panel. Thus, the fixing strength of the battery pack 100 to the vehicle body can be enhanced as compared with the case where only the bottom face of the battery pack 100 is fixed to the vehicle body.

DESCRIPTION OF REFERENCE NUMERALS

1: vehicle
20: bracket
40: reinforcing bar (reinforcing member)
50: support member
71, 71: duct
80: heat transfer member
100: battery pack (power source apparatus)
110: lower-stage battery stack (power source unit)
111: lower-stage battery case (power source unit)
112, 122: battery module (power storage element)
120: upper-stage battery stack
121: upper-stage battery case
130: electronic device
131: device case (electronic device)
200: partition panel
201: opening portion 210: cross member
220: floor panel

The invention claimed is:

1. A structure for mounting a power source apparatus, comprising:
 a power source apparatus mounted on a vehicle; and
 a reinforcing member configured to reinforce connection between the power source apparatus and a vehicle body,
 wherein the power source apparatus has a power source unit and a device, the power source unit having a bottom face along the vehicle body, the device being fixed to an upper face of the power source unit, lying side by side with the power source unit in an up-down direction of the vehicle and having a length in a front-back direction of the vehicle smaller than a length of the power source unit,
 wherein a portion of the power source apparatus is located inside an opening portion formed in a partition panel, the partition panel separating space where a seat is placed from a luggage space,
 wherein the power source apparatus is placed adjacently to the seat in the front-back direction of the vehicle,
 wherein the reinforcing member is placed in a space surrounded by a back face of the seat, the upper face of the power source unit, and a side face of the device, the side face being opposed to the seat in the front-back direction of the vehicle, and
 wherein the reinforcing member extends across the opening portion in a left-right direction of the vehicle and is fixed at different portions to the power source apparatus and the partition panel.

2. The structure for mounting the power source apparatus according to claim 1, wherein the reinforcing member is located in a plane substantially orthogonal to an up-down direction of the vehicle and including the center of gravity of the power source apparatus.

3. The structure for mounting the power source apparatus according to claim 2, wherein the device includes:
 another power source unit different from the power source unit; and
 an electronic device fixed to an upper face of the other power source unit and connected to the two power source units.

4. The structure for mounting the power source apparatus according to claim 1, wherein the device includes:
 another power source unit different from the power source unit; and
 an electronic device fixed to an upper face of the other power source unit and connected to the two power source units.

5. The structure for mounting the power source apparatus according to claim 4, wherein the power source unit has a plurality of power storage elements connected electrically in series to each other and performing charge and discharge.

6. The structure for mounting the power source apparatus according to claim 5, further comprising a heat transfer member in contact with the reinforcing member and each of the power storage elements to allow heat transfer between the reinforcing member and each of the power storage elements,
 wherein the reinforcing member has a hollow portion formed along a longitudinal direction of the reinforcing member and configured to flow a heat exchange medium used in temperature adjustment of the power storage elements.

7. The structure for mounting the power source apparatus according to claim 1, wherein the device is an electronic device connected to the power source unit.

8. The structure for mounting the power source apparatus according to claim 1, wherein the power source unit has a plurality of power storage elements connected electrically in series to each other and performing charge and discharge.

9. The structure for mounting the power source apparatus according to claim 8, further comprising a heat transfer member in contact with the reinforcing member and each of the power storage elements to allow heat transfer between the reinforcing member and each of the power storage elements,
 wherein the reinforcing member has a hollow portion formed along a longitudinal direction of the reinforcing member and configured to flow a heat exchange medium used in temperature adjustment of the power storage elements.

* * * * *